United States Patent
Koehler

(10) Patent No.: US 7,141,169 B2
(45) Date of Patent: Nov. 28, 2006

(54) METHOD AND APPARATUS FOR BIOSUSTAINING WASTE ACTIVATED VERMICULAR ENVIRONMENT

(76) Inventor: Peter L. Koehler, 7 Bevell La., North Syracuse, NY (US) 13212

( * ) Notice: Subject to any disclaimer, the term of this patent is extended or adjusted under 35 U.S.C. 154(b) by 144 days.

(21) Appl. No.: 10/872,174

(22) Filed: Jun. 18, 2004

(65) Prior Publication Data

US 2005/0133442 A1 Jun. 23, 2005

Related U.S. Application Data

(60) Provisional application No. 60/531,716, filed on Dec. 22, 2003.

(51) Int. Cl.
*C02F 3/32* (2006.01)
(52) U.S. Cl. .............. 210/602; 210/173; 210/259; 119/6.7
(58) Field of Classification Search .............. 210/602, 210/612, 173, 252, 259; 119/6.7
See application file for complete search history.

(56) References Cited

U.S. PATENT DOCUMENTS

| | | | |
|---|---|---|---|
| 4,262,633 A | | 4/1981 | Taboga |
| 4,285,719 A | * | 8/1981 | Criss ........................... 71/13 |
| 5,192,428 A | | 3/1993 | Lindstrom |
| 5,744,041 A | * | 4/1998 | Grove ........................ 210/602 |
| 6,223,687 B1 | | 5/2001 | Windle |
| 6,601,243 B1 | | 8/2003 | Colombot |
| 2002/0144339 A1 | * | 10/2002 | Colombot ..................... 4/449 |
| 2003/0141245 A1 | * | 7/2003 | Fetterman et al. .......... 210/609 |
| 2004/0065610 A1 | * | 4/2004 | Shankar et al. ............. 210/602 |

FOREIGN PATENT DOCUMENTS

| | | | |
|---|---|---|---|
| EP | 0 999 194 A2 | | 5/2000 |
| EP | 0999194 | * | 5/2000 |
| FR | 278 508 | | 2/2000 |
| JP | 56-67597 | * | 6/1981 |
| JP | 57-135093 | * | 8/1982 |
| JP | 57-147491 | * | 9/1982 |

* cited by examiner

*Primary Examiner*—Fred G. Prince
(74) *Attorney, Agent, or Firm*—George R. McGuire; Bond, Schoeneck & King, PLLC; Robert Sinnema

(57) ABSTRACT

A system for processing sewage into vermicompost includes a holding tank for receiving and initially processing the sewage. A treatment tank, connected to the holding tank by a first pipe, is used for treating the initially processed sewage from the holding tank to ensure optimal pH, percent of solids, and electrical conductivity of the sewage. A distribution tank, connected to the treatment tank by a second pipe, is used for heating or cooling the sewage from the treatment tank as necessary. A distribution apparatus, connected to the distribution tank by a third pipe, distributes the sewage to a vermicular environment, wherein the vermicular environment contains a plurality of worms which digest the distributed treated sewage into vermicompost.

49 Claims, 2 Drawing Sheets

METHOD AND APPARATUS FOR BIOSUSTAINING WASTE ACTIVATED VERMICULAR ENVIRONMENT

CROSS-REFERENCE TO RELATED APPLICATIONS

This application claims priority from U.S. Provisional Application Ser. No. 60/531,716 entitled BIOSUSTAINING WASTE ACTIVATED VERMICULAR ENVIRONMENT filed on Dec. 22, 2003, incorporated herein by reference.

FIELD OF THE INVENTION

This invention relates generally to the field of waste treatment systems, and more particularly to a waste treatment system in which the waste is treated by being digested by worms.

BACKGROUND OF THE INVENTION

The ability of worms to compost organic matter has long been known. Various attempts have been made to apply this knowledge to treating human waste. For example, U.S. Pat. No. 4,262,633 (Taboga) discloses using worms for reclaiming and processing biodegradeable waste into poultry products and humus-like substances. U.S. Pat. No. 5,192,428 (Lindstrom) discloses using worms in a natural composting bed which includes human waste. U.S. Pat. No. 6,223,687 (Windle) discloses using worms for composting a thin layer of biomass, and especially cow manure. U.S. Pat. No. 6,601,243 (Colombot) discloses using worms to compost a composting medium formed in part by human waste.

Common limitations are the quantity of waste able to be processed and the smell involved when processing human waste. The known prior art which uses vermiculture to process wastes requires extensive processing of the waste before it is composted, and quite frequently requires extensive processing during the composting phase. A need therefore exists for a system and method of processing sewage in an economical, low maintenance, and odor free manner.

SUMMARY OF THE INVENTION

Briefly stated, a system for processing sewage into vermicompost includes a holding tank for receiving and initially processing the sewage. A treatment tank, connected to the holding tank by a first pipe, is used for treating the initially processed sewage from the holding tank to ensure optimal pH, percent of solids, and electrical conductivity of the sewage. A distribution tank, connected to the treatment tank by a second pipe, is used for heating or cooling the sewage from the treatment tank as necessary. A distribution apparatus, connected to the distribution tank by a third pipe, distributes the sewage to a vermicular environment, wherein the vermicular environment contains a plurality of worms which digest the distributed treated sewage into vermicompost.

A biosustaining waste activated vermicular environment uses earthworms to convert raw sewage to usable compost. Raw sewage is introduced to the system. Filtration and screening yields an unconvertible residue of about 0.05% by volume per mass of solid wastes which is suitable for landfill disposal. The remaining 99.95% of the raw sewage originally introduced to the system is prepared and formulated into a liquid/solid mix which is then applied directly to a specifically configured earthworm bed where it is processed by the worms producing a substantial volume of environmentally acceptable, nutrient rich vermicompost suitable for direct use in various applications for landscaping, horticulture, golf courses, municipal parks, etc.

The critical aspects of the system are sewage waste preparation, earthworm bed configuration, and sewage waste solution application to the worm bed. Some aspects of the system are specific and critical with narrow ranges of acceptable values. Other aspects are more flexible allowing for some variation, i.e., a broader range of acceptable values exists. Significant departure from the acceptable values which make up the system will seriously and adversely effect or eliminate its biosustainability and its efficacy as an effective sewage treatment process.

According to an embodiment of the invention, a system for processing sewage into vermicompost includes at least one holding tank, wherein the sewage is initially processed; a treatment tank connected to the holding tank by a first pipe, wherein the initially processed sewage from the holding tank is treated to ensure optimal pH, percent of solids, and electrical conductivity of the sewage; a distribution tank connected to the treatment tank by a second pipe, wherein the treated sewage from the treatment tank is heated or chilled as necessary to reach an optimal temperature; and a distribution apparatus, connected to the distribution tank by a third pipe, which distributes the sewage to a vermicular environment, wherein the vermicular environment contains a plurality of worms, wherein the worms digest the distributed treated sewage into vermicompost.

According to an embodiment of the invention, a system for processing sewage into vermicompost includes means for receiving the sewage; means for treating the received sewage; and means for distributing the treated sewage to a vermicular environment containing a plurality of worms, wherein the worms digest the distributed treated sewage into vermicompost.

According to an embodiment of the invention, a method for processing sewage into vermicompost includes the steps of (a) receiving the sewage; (b) screening a majority of nondigestible solids from the sewage; (c) grinding the screened sewage so that particulate matter in the sewage is no larger than about ¼ inch; (d) testing the ground sewage, and based on results of the testing, adding fluid to the sewage to obtain optimal specifications for a pH of the sewage, an electrical conductivity of the sewage, and a percent of solids in the sewage; (e) measuring a temperature of the tested sewage and adjusting the temperature as required depending on results of the measuring; and (f) distributing, after the step of measuring, the treated sewage to a vermicular environment containing a plurality of worms, wherein the worms digest the distributed treated sewage into vermicompost.

DETAILED DESCRIPTION OF THE PREFERRED EMBODIMENT

Figure 1:
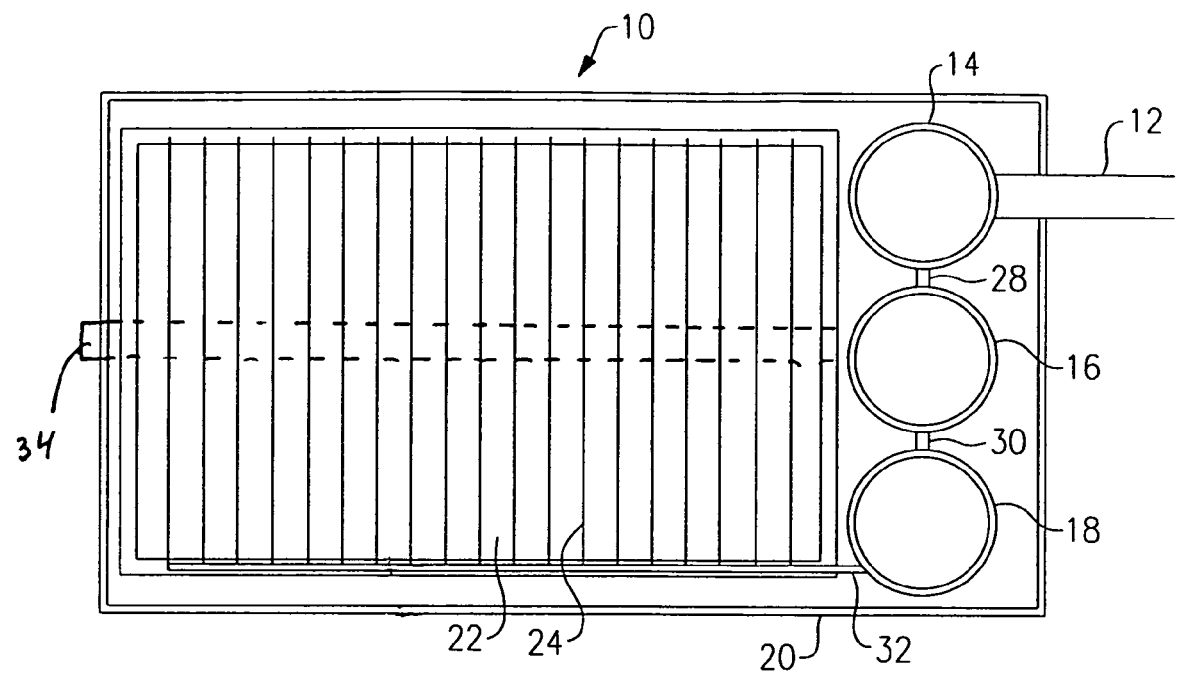
FIG. 1 shows a schematic diagram of an embodiment of the present invention.
Figure 2:
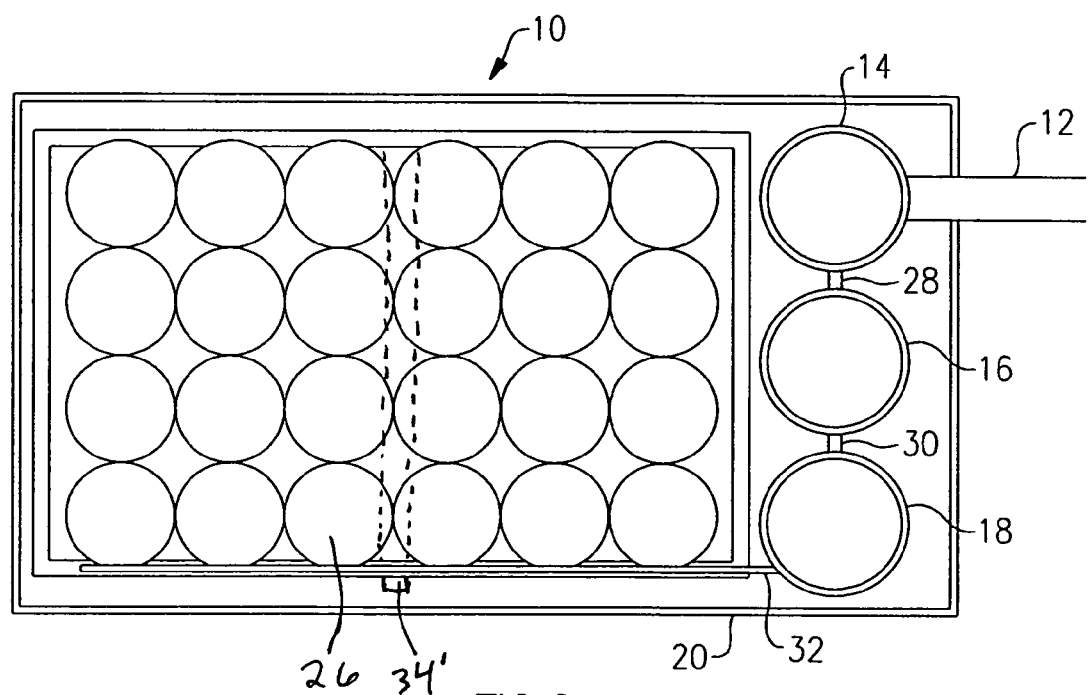
FIG. 2 shows a schematic diagram of an embodiment of the present invention.

Referring to FIGS. 1–2, a system 10 includes discrete components which are interrelated within specified tolerances resulting in an efficient, effective, and economically feasible method of treating and disposing of a substantial volume of human and animal sewage/waste. The entire system operates indoors, under one roof, thus presenting an exterior appearance that can be aesthetically pleasing, unassuming, and architecturally appropriate in a wide range of settings. The process involves the application of sewage/waste in liquid state ("effluent") to specifically prepared earthworm beds wherein virtually all environmentally harmful or undesirable solids are digested by the worms, resulting in the production of a high nutrient vermicompost suitable for direct application in a number of settings such as horticulture, landscaping, golf courses, municipal parks, etc. In one embodiment, system 10 includes an effluent input line 12 which passes effluent into a first tank 14 for initial processing, while in another embodiment, effluent is pumped from a truck or other container directly into first tank 14. After processing in first tank 14, the effluent is sent to a second tank 16 via a line 28. After processing in second tank 16, the effluent is sent to a third tank 18 via a line 30. The effluent is ready for feeding to a worm bed 22 after being processed in third tank 18. The effluent is shown being sent to worm bed 22 via a line 32, which connects to either a plurality of drip lines 24 or a plurality of spray lines 26 as shown in FIG. 2. These components are housed in an enclosure 20, which may be completely closed for northern climates or partially open for hotter climates. At least one drain line 34 collects leachate from worm bed 22 which is then available for use in the process. Drain line 34 is shown in FIG. 1 as running the length of worm bed 22, but is shown in FIG. 2 as drain line 34' running across the width of worm bed 22.

Figure 3:
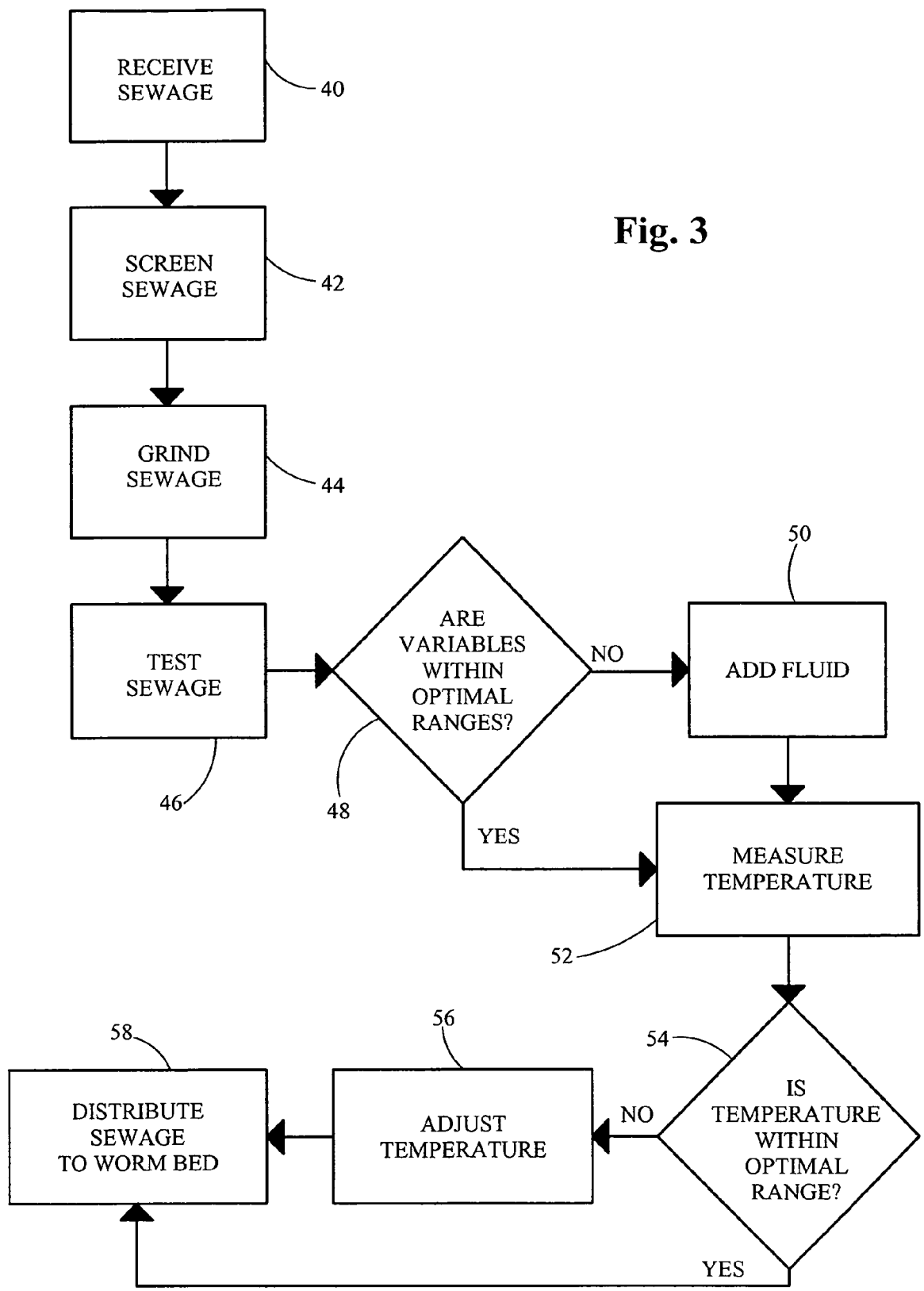
FIG. 3 shows a flow chart of an embodiment of a method of the present invention.

Referring to FIG. 3, a flow chart for treating sewage according to an embodiment of the invention is shown. The sewage is received in step 40, where it is screened in step 42 to remove a majority of the nondigestible solids from the sewage. The screened sewage is then ground in step 44 so that particulate matter in the sewage is no larger than about ¼ inch. The sewage is then tested in step 46 for pH, percentage of solids in the sewage, and electrical conductivity, and if the variable are determined to be within optimal ranges (step 48), the temperature is measured in step 52. If the variables are not within optimal ranges, fluid, preferably leachate from worm bed 22 or optionally fresh water, is added until the variables are within the optimal ranges, after which the temperature is measured in step 52. If the temperature is not within the optimal range in step 54, the temperature is adjusted in step 56 before the sewage is distributed in step 58. If the temperature is within the optimal range in step 54, the sewage is then distributed to the worm bed in step 58, where the worms digest the distributed treated sewage into vermicompost.

The sewage/waste treatment system utilizes the natural eating/digestive process of earthworms to transform raw sewage into environmentally useful compost suitable for use in a number of applications in horticulture, landscaping, golf courses, etc. The component parts of the system include earthworms, a structure to house the waste system components, an earthworm living environment/waste treatment bed, a series of tanks for collecting and processing the effluent, several pumps, grinders, and filters/screens used to create the appropriate balance in the effluent to make it suitable for application onto the waste treatment bed where it is eaten and transformed into compost by the worms, spray or drip applicators to apply the effluent to the worm bed, and a process to harvest the worms and compost periodically.

Earthworms. There are more than 2000 species of earthworms globally. Several species are appropriate for use in the system. The selection of which species to use in a given system application is determined by earthworm behavior in a given climate, i.e. eating, digestion rate, as affected by temperature, soil conditions (pH, electrical conductivity, etc.). The preferred species is the *Eisenia foetida* whose eating habits and capabilities have been proven by experimentation to be optimal for the temperate climate of most of the contiguous 48 states of the continental United States. Other species tested include *Lumbricus rubellus, Dendrobaena rubida, Eiseniella tetraedra, Allolobophora caliginosa*, and *Allolobophora rosea*.

The most extreme climate parameters of a more northerly, arctic, or sub-arctic environment or conversely, a more tropical or subtropical environment night suggest another worm species. *Eisenia foetida* (red worms) are preferred since they consume, naturally and normally, 1½ times their body weight every 24 hours in the optimal temperature range of 55–80 degrees F. They also reproduce at a rate that makes it practical to maintain a healthy, stable population over long periods, i.e., several years, of time. While they can live and eat in temperatures below 60 degrees F. or above 80 degrees F., their eating capacity slows down about 30% outside of their preferred optimal temperature range (55–80 degrees F.). In the latitude and temperature range of the experimental embodiment, one can begin the process with about 150 worms per square foot of bed or a density of about 300 worms per cubic foot of top layer.

Building/Shelter. In warm climates, e.g., in the continental U.S. below about latitude 36 degrees North, an open sided structure to shelter the treatment bed, tanks, and equipment from rain, wind, and prolonged sunlight is required. An open shelter is adequate for these climes. In cooler or cold climates an enclosed building structure is required which permits temperature regulation for the treatment bed and associated equipment.

In the natural environment worms become more mobile at night as they move about in search of food ("walking") while predation is not an issue. It is therefore advisable to keep the worm bed illuminated at all times. If there are windows in the building where the system is located, then some illumination at night is all that is needed. Approximately 40%–50% of daytime light levels are adequate to prevent walking. If there is no natural light during the day, i.e., no windows in the building, then some provision for a comfortable level, for human staff, of light is necessary and adequate for the worms. In the experimental embodiment with the 520 sq. ft. bed, optimal night time illumination was accomplished by using three 48" fluorescent tubes of 40 watts each suspended 6' lengthwise above the midline of the 35'×15' bed.

Waste treatment bed/earthworm living environment. The surface area, total volume, drainage characteristics, and overall shape of the waste treatment bed are not fixed in and of themselves. Together, however, these aspects of bed design and construction are critically interrelated. For example, the actual shape of the bed, whether round, rectangular, square, etc., may be adjusted to conform to local geography, building type/shape, etc. Practical considerations related to application of effluent to the bed surface, absorption into the bed, compost harvesting, and general bed maintenance all must be reflected in the bed design and construction. The embodiment tested most extensively to date is a rectangular bed. Knowing how much effluent/day is being processed determines the dimensions (square footage) of this bed. For example, 390 gal/day effluent is optimally processed in a bed of 520 square feet. Optimal processing means that all effluent delivered to the worm bed is processed by the worms within a 24 hour period in order to prevent malodorous odors from being released. The dimensions and characteristics (other than square footage/surface area) are constant regardless of the bed's surface dimensions. For example, the top layer of all beds should be 6" to 15" deep for the earthworm living environment depending on the climate. The depth of the top layer varies from 6" for moderate climates to 15" for very warm/hot climates. Appropriate bed depth is a critical aspect of maintaining bed temperature within the optimal range of 60 to 70 degrees Fahrenheit. Within this range, the eating habits and metabolic processes of the worms assure efficient and thorough waste digestion and processing. The worms themselves can and do tolerate temperatures within a much wider range of 45 to 95 degrees F., but their feeding/digestive performance drops off considerably as the outer limits of the broader temperature range is approached. It is preferable to build in simple liquid waste heating/cooling capabilities in the system process just prior to applying the effluent to the waste bed in order to be able to regulate or fine tune the bed temperature during brief periods of extreme outside temperature fluctuations lasting more than a day or two.

The top layer is preferably composed of 50% peat moss and 50% nutrient rich, sand free topsoil, and e.g. black dirt/muck land soil. This sits on top of the base layer, composed of a sand/gravel mix 12"–18" deep, with 18" being the preferred embodiment as this affords optimal drainage for the bed. A sheet of porous landscaping fabric is optionally used to separate the two layers. This fabric sheet is optionally used as an integral component of compost harvesting later in the process. The entire bed sits on grade and is preferably contained within a berm around the perimeter, with a poly-liner or asphalt liner which creates a water tight "basin" in which the bed is located. In the experimental embodiment, a series of 4" perforated pipes within the base layer run from the outer edges every 6' to the center where they join a 4" perforated pipe running the length of the bed to provide drainage for the leachate which seeps down through the earthworm living environment (above) into the base layer. These drain pipes are pitched (e.g. 1"/20 ft.) and lead into a sump pit where the leachate is collected to be pumped back into one of the processing tanks (recirculated) through the system as needed. The size by volume of the sump pit is related to the overall size, i.e., the surface area, of the treatment bed. In this example, with a bed size of 525 sq. ft treating 390 gal/day, a sump pit of 300 gal capacity is optimal.

Tanks. The three tanks in the system are constructed from steel, concrete, fiberglass, plastic, etc. The material used in the tank construction is not in and of itself critical to the system. Practical considerations such as cost and maintenance determine tank construction material. In the experimental embodiment, a tank size in gallons appropriate for processing 390 gal. of raw sewage per day is 1000 gal. capacity per tank. Within each tank, the filters, screens, agitators and pumps utilize some volume (1½ to 2½ cubic feet per tank). In addition, each tank may be holding some of the effluent as it is being ground up, filtered, screened, adjusted for pH, electrical conductivity, etc. The capacity of three 1000 gal. tanks for 390 gal/day raw sewage being treated affords a reasonable working margin of safety to accommodate constantly incoming effluent in the event of an interruption in the process from such things as power outages, external events, accidents, etc.

Sewage/waste is delivered to the system location, either from a sewer system or from special trucks which pump out septic tanks, and pumped into one or more collecting tanks such as first tank 14 through a coarse screen, such as a bar screen, preferably set at ½". This initial screen separates the large (greater than ½" size), heavy, consolidated objects and particles in the incoming raw sewage, such as sanitary napkins, condoms, hair masses, grease balls, and miscellaneous foreign objects which were collected as part of the raw sewage from local septic systems or municipal waste treatment facilities. The nondigestible solids which were part of the waste/sewage introduced at the beginning of the process now constitute merely approximately 0.05% of the total volume of effluent being processed. These solid wastes (0.05% of total volume) are set aside for deposit in the local landfill. The remaining 99.95% of the effluent volume is processed by the worms in the system.

Preferably while still in first tank 14, the raw sewage passes through a ⅜" screen filter and then is drawn into a grinder pump, which preferably sits on the bottom of first tank 14, where it is ground into ¼" or smaller particles to reduce the solid/particulate size so the solids remain in suspension during the next treatment phase. The sewage is then pumped from first tank 14 to second tank 16. In the experimental embodiment, the pumping from first tank 14 to second tank 16 is accomplished though line 28, which is a 2" diameter, schedule 80, PVC pipe. The preferable type and size of pipes depends on the volume of effluent being processed, and such a determination is considered to be within the skill level of one skilled in the art.

From the collecting tank, the effluent is passed through one or more screens into one or more treatment tanks such as second tank 16. In the experimental embodiment, the effluent is pumped through a ¼" mesh sidehill screen on the top of second tank 16 onto a second screen with ⅛" openings and then into tank 2. The purpose for the two consecutive screens at the top of second tank 16 is to catch as much hair as possible for manual collection and removal prior to the effluent entering second tank 16. In second tank 16, the liquid sewage/waste and small particle mix are agitated, sampled and tested as to percent of solids suspended, electrical conductivity, and pH. Fresh water or leachate is added as necessary to bring the percent of solids, pH value, and conductivity to the values required for the solution to be suitable for direct application to the worm bed environment, but leachate is preferably used first before adding fresh water. The optimal specifications for the effluent feed mix are pH in the 5 to 8 range, percent of solids in the 1% to 5% range, and electrical conductivity in a range of 1–3 millisiemens. The solid particles in the effluent solution are preferably kept in suspension by an agitator, which cycles off/on and is controlled by a timer.

When the optimal values are obtained in the treatment tank, i.e., second tank 16, by adding or drawing off liquid as necessary, the effluent feed mix solution, consisting of liquid and solids/particulates in suspension, is continuously agitated and preferably pumped through a screen filter into one or more distribution tanks such as third tank 18. In the experimental embodiment, the effluent is pumped from second tank 16 to third tank 18 through a line 30 which is 2" PVC, schedule 80, pipe. The effluent is preferably tested again to confirm pH, electrical conductivity, percent of solids by volume, and temperature prior to application to the waste treatment bed. Depending on the local ambient temperature of the waste treatment bed, the effluent solution may be heated or chilled by passing it through heater/chiller coils before application to the waste treatment bed. The temperature of the effluent solution applied to the worm bed is preferably in the temperature range between 55 to 80 degrees F. depending on local bed conditions. The worm bed temperature is preferably kept at between 60 to 70 degrees, with 65 to 70 degrees being optimal. Third tank 18 also preferably contains an agitator and a pump. The agitator preferably turns on about 10 minutes prior to the pump turning on to keep the solids in suspension in the effluent. The effluent is pumped through a line 32 such as a 2" PVC, schedule 80, pipe to the distribution system for application to the waste treatment bed via spray or gravity drip.

From the distribution tank, i.e., third tank 18, the effluent is distributed to the worm bed. The application/distribution may be accomplished using a pressure (@35–40 lbs/sq. in.) nozzle/spray system or gravity feed pipe/trough system. Uniform application to the worm bed is critical and must be monitored for volume, application time (duration), and bed saturation. The volume of solids (1%–5% of total liquid volume) is critically related to the digestive capabilities of the mass/number of worms living in the bed. The number/mass of worms in the bed must be sufficient to completely digest all of the solids being applied within a 24 hr. period in order to avoid bed degradation and malodorous emissions from excessive build up of decaying waste on the bed surface. Some odors have been noticed with spray distribution, but none have been noticed with drip distribution.

Worm bed maintenance. Every two to three years the worm bed needs to be rejuvenated by removing excess vermicompost which has built up on the bed. Over time, the natural process of their eating and digesting the raw sewage mixture, which is applied to the bed, coupled with their prolific reproductive activity necessitates the harvesting the accumulated compost and worms in order to refresh the bed. The compost level grows at around 4" to 6" per year. It is preferable to start with a 6" bed of dirt and peat and harvest when the bed depth reaches about 12 to 15 inches. Too much depth creates problems because the worms become less likely to travel to the upper layers as often, which leads to unprocessed (uneaten) effluent and therefore odors. The particular method of harvesting the compost and excess worms is not critical to the system, with many such systems being known in the art. The dirt and peat combination stays in the worm bed; only the vermicompost is removed. Bed rejuvenation is preferably done in sections so the sewage/waste treatment process can continue while the compost is removed one section at a time. During this bed rejuvenation process the worms are carefully harvested using commercially available worm separators, maintained, and then reintroduced to the freshened bed to begin the vermicomposting cycle anew. This process does not harm the worms; in fact, the worms benefit by having a fresh, clean nutritive environment in which to live.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A system for processing sewage into vermicompost, comprising:
    at least one holding tank, wherein said sewage is initially processed;
    at least one treatment tank connected to said holding tank by a first pipe, wherein said initially processed sewage from said holding tank is treated to ensure optimal pH, percent of solids, and electrical conductivity of said sewage;
    at least one distribution tank connected to said treatment tank by a second pipe, wherein said treated sewage from said treatment tank is heated or chilled as necessary to reach an optimal temperature; and
    a distribution apparatus, connected to said distribution tank by a third pipe, which distributes said sewage to a vermicular environment, wherein said vermicular environment contains a plurality of worms, wherein said worms digest said distributed treated sewage into vermicompost.

2. A system according to claim 1, further comprising a first screen, a first agitator, and a first pump operatively associated with said holding tank.

3. A system according to claim 2, further comprising a second screen, a second agitator, and a second pump operatively associated with said treatment tank.

4. A system according to claim 2, further comprising a coarse screen operatively associated with said first holding tank and disposed such that sewage entering said holding tank passes through said coarse screen before entering said holding tank.

5. A system according to claim 4, further comprising a grinder effective for grinding solids in said sewage after said sewage has passed through said first screen in said holding tank.

6. A system according to claim 5, further comprising a third screen operatively associated with said second screen, such that sewage entering said treatment tank from said holding tank passes through said second screen and then said third screen.

7. A system according to claim 6, wherein said second screen has about a ¼ inch mesh and said third screen has about a ⅛ inch mesh.

8. A system according to claim 1, wherein said optimal pH is a range between about 5 and about 8, said optimal percent of solids is in a range between about 1–5% by volume, and said optimal electrical conductivity is no more than 3 millisiemens.

9. A system according to claim 1, wherein said optimal temperature is effective to keep a temperature of said worm bed in a range from about 60 to 70 degrees F.

10. A system according to claim 1, wherein said distribution apparatus includes at least one gravity-feed drip pipe.

11. A system according to claim 1, wherein said distribution apparatus includes at least one pressure spray nozzle.

12. A system according to claim 1, wherein said worms are of a species *Eisenia foetida*.

13. A system according to claim 1, wherein said vermicular environment includes a worm bed, said worm bed having at least first and second layers, wherein said first layer includes a mix of sand and gravel from about 12 inches to about 18 inches deep, and said second layer includes a mixture of peat moss and nutrient rich, sand free topsoil from about 6 inches to about 15 inches deep.

14. A system according to claim 13, wherein said worm bed is contained in a shelter, wherein said shelter is an open-sided structure when said worm bed is disposed below about 36 degrees North latitude, and wherein said shelter is an enclosed building when said worm bed is disposed above about 36 degrees North latitude.

15. A system according to claim 1, wherein said vermicular environment includes illumination 24 hours per day.

16. A system according to claim 15, wherein a level of said illumination during hours of darkness is approximately 40%–50% of a level of said illumination during daylight hours.

17. A system according to claim 1, wherein said vermicular environment includes a leachate drain pipe.

18. A system for processing sewage into vermicompost, comprising:
   means for receiving said sewage;
   means for treating said received sewage; and
   means for distributing said treated sewage to a vermicular environment containing a plurality of worms, wherein said worms digest said distributed treated sewage into vermicompost and wherein said vermicular environment includes a worm bed, said worm bed having at least first and second layers, wherein said first layer includes a mix of sand and gravel from about 12 inches to about 18 inches deep, and said second layer includes a mixture of peat moss and nutrient rich, sand free topsoil from about 6 inches to about 15 inches deep.

19. A system according to claim 18, wherein:
   said means for receiving said sewage includes at least one holding tank, wherein said sewage is initially processed;
   said means for treating said received sewage includes at least one treatment tank connected to said holding tank by a first pipe, wherein said initially processed sewage from said holding tank is treated to ensure optimal pH, percent of solids, and electrical conductivity of said sewage; and
   said means for distributing said treated sewage includes at least one distribution tank connected to said treatment tank by a second pipe, wherein said treated sewage from said treatment tank is heated or chilled as necessary to reach an optimal temperature, and a distribution apparatus, connected to said distribution tank by a third pipe, which distributes said sewage to a vermicular environment, wherein said vermicular environment contains a plurality of worms, wherein said worms digest said distributed treated sewage into vermicompost.

20. A system according to claim 19, wherein said means for receiving further includes a first screen, a first agitator, and a first pump operatively associated with said holding tank.

21. A system according to claim 20, wherein said means for treating further includes a second screen, a second agitator, and a second pump operatively associated with said treatment tank.

22. A system according to claim 20, wherein said means for receiving further includes a coarse screen operatively associated with said first holding tank and disposed such that sewage entering said holding tank passes through said coarse screen before entering said holding tank.

23. A system according to claim 22, wherein said means for receiving further includes a grinder effective for grinding solids in said sewage after said sewage has passed through said first screen in said holding tank.

24. A system according to claim 23, wherein said means for treating further includes a third screen operatively associated with said second screen, such that sewage entering said treatment tank from said holding tank passes through said second screen and then said third screen.

25. A system according to claim 24, wherein said second screen has about a inch mesh and said third screen has about a ⅛ inch mesh.

26. A system according to claim 19, wherein said optimal pH is a range between about 5 and about 8, said optimal percent of solids is in a range between about 1–5% by volume, and said optimal electrical conductivity is no more than 3 millisiemens.

27. A system according to claim 19, wherein said optimal temperature is effective to keep said worm bed at a temperature in a range from about 60 to 70 degrees F.

28. A system according to claim 18, wherein said means for distribution includes at least one gravity-feed drip pipe.

29. A system according to claim 18, wherein said means for distribution includes at least one pressure spray nozzle.

30. A system according to claim 18, wherein said worms are of a species *Eisenia foetida*.

31. A system according to claim 18, wherein said worm bed is contained in a shelter, wherein said shelter is an open-sided structure when said worm bed is disposed below about 36 degrees North latitude, and wherein said shelter is an enclosed building when said worm bed is disposed above about 36 degrees North latitude.

32. A system according to claim 18, wherein said vermicular environment includes illumination 24 hours per day.

33. A system according to claim 32, wherein a level of said illumination during hours of darkness is approximately 40%–50% of a level of said illumination during daylight hours.

34. A system according to claim 18, wherein said vermicular environment includes a leachate drain pipe.

35. A method for processing sewage into vermicompost, comprising the steps of:
   screening a majority of nondigestible solids from said sewage;
   grinding said screened sewage so that particulate matter in said sewage is no larger than about ¼ inch;
   testing said ground sewage, and based on results of said testing, adding fluid to said sewage to obtain optimal specifications for a pH of said sewage, an electrical conductivity of said sewage, and a percent of solids in said sewage;
   measuring a temperature of said tested sewage and adjusting said temperature as required depending on results of said measuring; and
   distributing, after said step of measuring, said treated sewage to a vermicular environment containing a plurality of worms, wherein said worms digest said distributed treated sewage into vermicompost.

36. A method according to claim 35, further comprising the step of screening said ground sewage for hair before said step of testing.

37. A method according to claim 35, wherein said step of distributing includes agitating said treated sewage before sending said treated sewage to said vermicular environment.

38. A method according to claim 35, wherein said optimal pH is a range between about 5 and about 8, said optimal percent of solids is in a range between about 1–5% by volume, and said optimal electrical conductivity is no more than 3 millisiemens.

39. A method according to claim 35, wherein said optimal temperature is in a range effective to keep a temperature of said worm bed from about 60 to 70 degrees F.

40. A method according to claim 35, wherein said step of distributing includes using at least one gravity-feed drip pipe to distribute said treated sewage to said vermicular environment.

41. A method according to claim 35, wherein said step of distributing includes using at least one pressure spray nozzle to distribute said treated sewage to said vermicular environment.

42. A method according to claim 35, wherein said worms are of a species *Eisenia foetida*.

43. A method according to claim 35, wherein said vermicular environment includes a worm bed, said worm bed having at least first and second layers, wherein said first layer includes a mix of sand and gravel from about 12 inches to about 18 inches deep, and said second layer includes a mixture of peat moss and nutrient rich, sand free topsoil from about 6 inches to about 15 inches deep.

44. A method according to claim 43, wherein said worm bed is contained in a shelter, wherein said shelter is an open-sided structure when said worm bed is disposed below about 36 degrees North latitude, and wherein said shelter is an enclosed building when said worm bed is disposed above about 36 degrees North latitude.

45. A method according to claim 43, further comprising the step of removing excess vermicompost from said worm bed when said vermicompost layer reaches about 6 to nine inches in depth.

46. A method according to claim 35, further comprising the step of illuminating said vermicular environment 24 hours per day.

47. A method according to claim 46, wherein a level of said illumination during hours of darkness is approximately 40%–50% of a level of said illumination during daylight hours.

48. A method according to claim 35, wherein said vermicular environment includes a leachate drain pipe.

49. A method according to claim 35, wherein said step of distributing includes distributing only an amount of treated sewage that can be fully digested by said worms within about 24 hours.

* * * * *

UNITED STATES PATENT AND TRADEMARK OFFICE
CERTIFICATE OF CORRECTION

PATENT NO. : 7,141,169 B2 Page 1 of 1
APPLICATION NO. : 10/872174
DATED : November 28, 2006
INVENTOR(S) : Peter L. Koehler It is certified that error appears in the above-identified patent and that said Letters Patent is hereby corrected as shown below:

In The Claims:

Col. 9, Line 66
Claim 25, line 2, between "a" and "inch" insert --1/4--.

Signed and Sealed this

Thirteenth Day of February, 2007

JON W. DUDAS
*Director of the United States Patent and Trademark Office*